US009860472B2

(12) United States Patent
Lee et al.

(10) Patent No.: US 9,860,472 B2
(45) Date of Patent: Jan. 2, 2018

(54) IMAGE SENSOR AND IMAGE PROCESSING SYSTEM THAT COMPENSATE FOR FIXED PATTERN NOISE (FPN)

(71) Applicant: SAMSUNG ELECTRONICS CO., LTD., Suwon-si, Gyeonggi-do (KR)

(72) Inventors: Hyeok Jong Lee, Seongnam-si (KR); Jin Ho Seo, Seoul (KR); Se Jun Kim, Seoul (KR); Sung Ho Suh, Hwaseong-si (KR); Young Tae Jang, Pyeongtaek-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 44 days.

(21) Appl. No.: 14/990,816

(22) Filed: Jan. 8, 2016

(65) Prior Publication Data

US 2016/0205332 A1 Jul. 14, 2016

(30) Foreign Application Priority Data

Jan. 9, 2015 (KR) .......................... 10-2015-0003487

(51) Int. Cl.
*H04N 5/217* (2011.01)
*H04N 5/378* (2011.01)
(Continued)

(52) U.S. Cl.
CPC ............. *H04N 5/378* (2013.01); *H04N 5/347* (2013.01); *H04N 5/3658* (2013.01);
(Continued)

(58) Field of Classification Search
CPC .. H04N 5/374; H04N 5/3745; H04N 5/37455; H04N 5/376; H04N 5/378; H04N 5/347; H01L 27/146; H01L 27/14603
(Continued)

(56) References Cited

U.S. PATENT DOCUMENTS 7,154,075 B2 12/2006 Krymski
7,542,075 B2 * 6/2009 Suzuki ................ H04N 5/3658
348/222.1
(Continued)

FOREIGN PATENT DOCUMENTS

JP 2004-289241 10/2004
JP 2009-213012 9/2009
(Continued)

*Primary Examiner* — Ngoc-Yen Vu
(74) *Attorney, Agent, or Firm* — Volentine & Whitt, PLLC

(57) ABSTRACT

An image sensor operating in a skip mode and reading out a pixel signal provided by at least one of a plurality of pixels and compensating for fixed pattern noise (FPN) in column-parallel pipelines. The image sensor includes; a switch signal generator that generates a first switch control signal and a second switch control signal in response to FPN location information characterizing a first pipeline among the column-parallel pipelines as a noisy pipeline generating FPN, and characterizing a second pipeline among the column-parallel pipelines as a quiet pipeline not generating FPN, a binning switch block including a first switch controlled by the first switch control signal and a second switch controlled by the second switch control signal, wherein the first switch control signal causes the first pipeline to be inactivated and the second switch control signal causes the second pipeline to be activated, and a binning block that performs a digital binning operation on digital signals provided via the column-parallel pipelines including the second pipeline.

20 Claims, 13 Drawing Sheets

(51) Int. Cl.
    *H04N 5/347*       (2011.01)
    *H04N 5/365*       (2011.01)
    *H04N 5/374*       (2011.01)
    *H04N 5/3745*     (2011.01)
    *H04N 5/335*       (2011.01)
    *H04N 5/77*        (2006.01)

(52) U.S. Cl.
    CPC ........... *H04N 5/374* (2013.01); *H04N 5/3745* (2013.01); *H04N 5/77* (2013.01)

(58) Field of Classification Search
    USPC .......................................... 348/308–310, 296
    See application file for complete search history.

(56) References Cited

U.S. PATENT DOCUMENTS

| | | | |
|---|---|---|---|
| 8,466,991 B2 * | 6/2013 | Mo | ........................ H04N 5/347 348/243 |
| 8,817,120 B2 | 8/2014 | Silverstein et al. | |
| 9,088,741 B2 * | 7/2015 | Sumi | ...................... H04N 5/243 |
| 9,282,245 B2 * | 3/2016 | Ise | .................... H04N 5/23245 |
| 2008/0158396 A1 | 7/2008 | Fainstain et al. | |
| 2013/0193334 A1 | 8/2013 | Dowaki | |

FOREIGN PATENT DOCUMENTS

| | | |
|---|---|---|
| JP | 2010-166528 | 7/2010 |
| JP | 2012-235534 | 11/2012 |
| KR | 1020070089466 A | 8/2007 |
| KR | 1020120016571 A | 2/2012 |
| KR | 1020120061523 A | 6/2012 |

\* cited by examiner

IMAGE SENSOR AND IMAGE PROCESSING SYSTEM THAT COMPENSATE FOR FIXED PATTERN NOISE (FPN)

CROSS-REFERENCE TO RELATED APPLICATION

This application claims priority under 35 U.S.C. §119 from Korean Patent Application No. 10-2015-0003487 filed on Jan. 9, 2015, the disclosure of which is hereby incorporated by reference in its entirety.

BACKGROUND

Embodiments of the present inventive concept relate generally to image sensors, and more particularly to image sensors capable of compensating a fixed pattern noise output through each column in the image sensor. Embodiments of the inventive concept also relate to image processing systems including this type of image sensor.

Complementary metal-oxide semiconductor (CMOS) image sensors (CIS) must convert an analog signal generated by an active pixel sensor (APS) array into a corresponding digital signal. This is usually accomplished by use of an analog to digital converter (ADC). Thus, a CMOS image sensor will operate, depending upon the image resolution required, according to one class of methods that use a single ADC or another class of methods that use a so-called column ADC. The column ADC is essentially an ADC having a relatively simple structure that may be embodied in each column of a CMOS image sensor. The column ADC has the advantage of consuming relatively less power even with a large chip area. Signal conversion methods associated with the column ADC may perform correlated double sampling (CDS) on an analog output voltage which is a pixel output signal, store the resulting voltage, and provide a comparison result for digital code generation by comparing the voltage stored by the CDS operation with a predetermined reference voltage (e.g., a ramp signal generated by a ramp generator).

In response to continuing demands for high resolution, certain high resolution and very densely integrated CIS have been developed. The unit pixel sizes of these high resolution CIS are so small that manufacturing yields may become negatively motivated. That is, as unit pixel size decreases, image quality may actually deteriorate due to, for example, noise issues associated with the pixel power supply circuitry. Decreasing unit pixel size therefore tends to increase the number of defective CIS identified during post-manufacturing screening. Of course, the identification of a defective CIS is a matter of degree, and various compensation schemes have been proposed to mitigate image quality deterioration.

Moreover, since an ADC capacitor of defined minimum area is often used in conventional ADC conversion methods, problems associated with so-called column fixed pattern noise (CFPN) may arise due to the resulting decrease in capacitance provided by the ADC capacitor, as well as impedance mismatching in each column of the ADC.

SUMMARY

An embodiment of the inventive concept is directed to an image sensor, including a switch signal generator which can operate in a skip mode reading out a pixel signal output from some of a plurality of pixels, compensate a fixed pattern noise in column-parallel pipelines embodied in the image sensor, and generate a plurality of switch control signals using fixed pattern noise location information generated based on the column-parallel pipelines, a binning switch block which causes first pipelines which generate the fixed pattern noise among the column-parallel pipelines to be inactive, and causes second pipelines which do not generate the fixed pattern noise among the column-parallel pipelines to be active, and a binning block which performs digital binning on a first digital signal and a second digital signal each output from the second pipelines.

Each of the column-parallel pipelines may include a plurality of pixels in units of columns, at least one switch embodied in the binning switch block, and a first analog-to-digital converter (ADC) including a first comparator and a first counter.

The fixed pattern noise may be generated by at least one of the plurality of pixels, or by the first ADC. According to an embodiment, the first pipelines and the second pipelines may be adjacent to each other. The image sensor may further include a memory storing the fixed pattern noise location information. According to an embodiment, the image sensor may cause at least one pipeline including an auto focus (AF) pixel among the column-parallel pipelines to be inactive, and the AF pixel may provide information for an auto focusing operation.

The image sensor may further include a memory which stores each of the fixed pattern noise location information and location information on the AF pixel.

The binning block may include a serial adder block which generates a compound signal by adding the first digital signal and the second digital signal, and a bit shift block which shifts the compound signal as much as a bit number which is set.

The binning switch block includes a plurality of switches, and the plurality of switches may be turned on or off in response to the plurality of switch control signals. The skip mode may be a live view mode which generates a live view image from a captured image, or a movie mode which generates a movie image from the image.

An embodiment of the inventive concept is directed to an image processing system, including an image sensor which operates in a skip mode reading out a pixel signal output from some of a plurality of pixels, and compensates a fixed pattern noise in column-parallel pipelines, and a processor which controls an operation of the image sensor, in which the image sensor includes a switch signal generator which generates a plurality of switch control signals using fixed pattern noise location information generated based on the column-parallel pipelines, a binning switch block which causes first pipelines which generate the fixed pattern noise among the column-parallel pipelines to be inactive, and causes second pipelines which do not generate the fixed pattern noise among the column-parallel pipelines to be active, and a binning block which performs digital binning on a first digital signal and a second digital signal each output from the second pipelines.

The image processing system may further include a camera serial interface which is connected between the image sensor and the processor.

Each of the column-parallel pipelines may include a plurality of pixels in units of columns, at least one switch embodied in the binning switch block, and a first analog-to-digital converter (ADC) including a first comparator and a first count. According to an embodiment, the first pipelines and the second pipelines are adjacent to each other. The image processing system may cause at least one pipeline including an auto focus (AF) pixel among the column-parallel pipelines to be inactive, and the AF pixel may provide information for an auto focusing operation.

An embodiment of the inventive concept is directed to a CMOS image sensor providing image data to digital signal processor. The CMOS image sensor includes; column-parallel pipelines providing respective output signals, wherein the column-parallel pipelines include a noisy pipeline that generates fixed pattern noise (FPN) and two quiet pipelines that do not generate FPN, a switch signal generator that generates a switch control signal, a binning switch block including a plurality of switches that inactivate the noisy pipeline and activate the two quiet pipelines in response to the switch control signal, and a binning block that performs a digital binning operation on output signals provided respectively via the two quiet pipelines to generate the image data.

BRIEF DESCRIPTION OF THE DRAWINGS

These and/or other aspects and advantages of the inventive concept will become apparent and more readily appreciated from the following description of the embodiments, taken in conjunction with the accompanying drawings of which.

DETAILED DESCRIPTION

Figure 1:
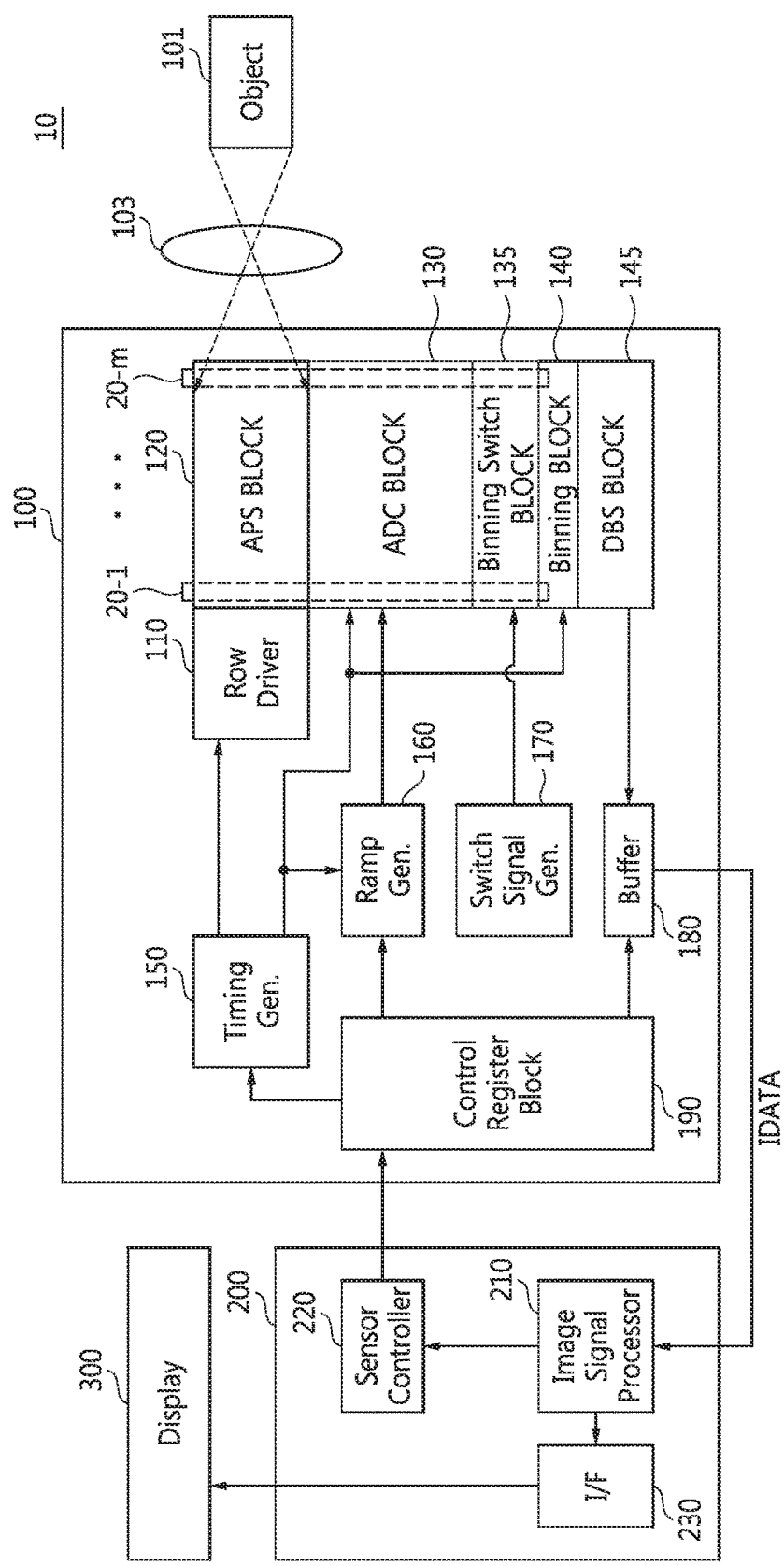
FIG. 1 is a block diagram of an image processing system according to an embodiment of the inventive concept.

The inventive concept now will be described more fully hereinafter with reference to the accompanying drawings in which certain exemplary embodiments are shown. The inventive concept may, however, be embodied in many different forms and should not be construed as being limited to only the illustrated embodiments. Rather, these embodiments are provided so that this disclosure will be thorough and complete, and will fully convey the scope of the invention to those skilled in the art. In the drawings, the size and/or relative sizes of various elements and features may be exaggerated for clarity. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 10 according to an embodiment of the inventive concept. Referring to FIG. 1, the image processing system 10 includes an optical lens 103, an image sensor 100, a digital signal processor (DSP) 200, and a display 300. The image processing system 10 may be embodied in a portable electronic device or a mobile computing device. The portable electronic device may be embodied in a laptop computer, a mobile phone, a smart phone, a tablet PC, a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

According to various embodiments, the image sensor 100 and DSP 200 may be embodied in one chip or different chips. The image sensor 100 generates image data (IDATA) associated with selected electromagnetic wavelengths (hereafter, simply referred to as "light" recognizing that embodiments of the inventive concept may be directed to applications wherein wavelengths outside the visual optical field are imaged) reflected (or generated) by an object 101, as captured by the optical lens 103. In the illustrated embodiment of FIG. 1, the image sensor 100 generally includes a row driver 110, an active pixel or active pixel sensor (APS) block 120, an analog-to-digital conversion (ADC) block 130, a binning switch block 135, a binning block 140, a data bus block 145, a timing generator 150, a ramp signal generator 160, a switch signal generator 170, a buffer 180, and a control register block 190.

Here, it is assumed that the image sensor 100 may operate in a "skip mode" whereby the signal output from some, but not necessarily all, of a plurality of pixels is selected read by the image sensor 100. The skip mode may include a live view mode generating a live view image from the captured image, and/or a movie mode generating a movie image from the captured image.

The image sensor 100 of FIG. 1 includes column-parallel pipelines 20-1 to 20-$m$, where 'm' is a natural number greater than one, capable of compensating for a fixed pattern noise (FPN). In this regard, FPN may be generated by one or more of a plurality of pixels included in the image sensor 100 and/or by one or more of the multiple ADC blocks 130 included in the image sensor 100.

Each of the column-parallel pipelines 20-1 to 20-$m$ includes a plurality of pixels arranged in column unit(s) included in the active pixel block 120, one corresponding ADC included in the ADC block 130, and at least one binning switch included in the binning switch block 135. With this general configuration, each of the column-parallel pipelines 20-1 to 20-$m$ may be used to generate digital signals corresponding to light associated with the imaged object 101, as captured through the optical lens 103.

The image sensor 100 may increase a yield rate of the image sensor 100 by causing first pipelines generating FPN among the column-parallel pipelines 20-1 to 20-$m$ to be inactive, and causing second pipelines, adjacent or proximate to the first pipelines, and not generating FPN to be active. That is, the image sensor 100 may generate image data IDATA in which the FPN is essentially compensated by replacing first (noisy) pipelines generating FPN with second (quiet) pipelines not generating or generating significantly less, FPN. In this context, the terms "noisy" and "quiet" will be understood as being relative in nature. That is, a pipeline designated as quiet will generate relatively less FPN than a noisy pipeline.

According to an embodiment, the image sensor 100 may generate image data DATA by replacing at least one noisy pipeline with a quiet pipeline that is adjacent (or proximate) to the noisy pipeline being replaced. According to an embodiment, the image sensor 100 may cause at least one pipeline (including an auto focus AF pixel) among the column-parallel pipelines 20-1 to 20$m$ to be inactive, where the AF pixel is a pixel providing information associated with an auto focusing operation. According to an embodiment, the image sensor 100 may be embodied in a semiconductor package including one or more chips.

The row driver 110 may be used to transmit control signal(s) controlling the operation of the plurality of pixels in an active pixel block 120. One or more of these control signal(s) may be provided by the timing generator 150. In this regard, the row driver 110 may be used to control the operation of pixels arranged in row units. One or more control lines may be used to transmit the control signal(s) between the row driver 110 and each row of pixels.

The active pixel block 120 include the plurality of pixels and may be referred to as a "pixel array". Under the control of appropriately timed control signals, each of the pixels (designated as "PX" in FIG. 2) accumulates optical charge resulting from incident light and generates a corresponding pixel signal. The pixels in the plurality of pixels are arranged in a matrix of rows and columns. Each pixel may include a photoelectric conversion element, and a plurality of transistors controlling the accumulation and discharge if optical charges by the photoelectric conversion element. Thus, each pixel may provide a pixel signal to a corresponding column line. For example, the photoelectric conversion element maybe embodied as a photodiode, a photo transistor, a photogate, or a pinned photodiode.

The ADC block 130 converts a pixel signal provided from the active pixel block 120 into a corresponding digital signal. The ADC block 130 may operate as a column-parallel analog digital converting (ADC) array, and may include a correlated double sampling (CDS) circuit that performs a correlated double sampling on the pixel signal provided by each column line included in the active pixel block 120.

The binning switch block 135 may be used to selectively activate/inactivate one or more of the column-parallel pipelines 20-1 to 20-$m$. Thus, one or more noisy pipeline(s) may be selectively inactivated in respective favor of proximate, quiet pipeline(s) in order to reduce fixed pattern noise. In the illustrated embodiment of FIG. 1, the binning switch block 135 may be controlled by switch control signals provided by the switch signal generator 170. Thus, the operation of the binning switch block 135 may cause a noisy pipeline including an AF pixel among the column-parallel pipelines to be inactive in response to switch control signals provided by the switch signal generator 170.

According to certain embodiments, the binning switch block 135 may control the output of pixel signals from the active pixel block 120. According to certain other embodiments, the binning switch block 135 may control the output of digital signals from the ADC block 130. According to still another embodiments, the binning switch block 135 may be embodied in the ADC block 130 and control an output of digital signals from the ADC block 130.

The binning block 140 performs a digital binning operation on one or more quiet digital signal(s) provided by quiet pipelines selectively activated by the binning switch block 135. Here, the digital binning operation may be understood as essentially combining optical charges accumulated by adjacent (or proximate) pixels in the image sensor 100 during a readout operation.

The data bus block 145 may be used to store signals provided by the binning block 140, and output the stored signals to the buffer 180. The timing generator 150 may be used to control operation of the row driver 110, ADC block 130, binning block 140, and ramp signal generator 160 under the control of the control register block 190. Additionally, the timing generator 150 may be used to control operation of the switch signal generator 170.

As previously noted, the switch signal generator 170 may be used to generate the switch control signals applied to the binning switch block 135 in response to FPN location information. This FPN location information may be generated based on the monitored operation of the respective column-parallel pipelines 20-1 to 20-$m$. For example, when the column-parallel pipelines 20-1 to 20-$m$ initially generate respective digital signals corresponding to light associated with the object 101, the image sensor 100 may generate and store FPN location information associated with each pipeline in a memory. Thereafter, the stored FPN location information may be used to designated noisy pipelines from among the available plurality of pipelines, or varyingly differentiate between noisy and quiet pipelines depending on environmental and/or control conditions. In one embodiment, the FPN location information is generated while the image sensor 100 operates in a "still mode" used to generate one or more still image(s). Thereafter, the image sensor 100 may use the FPN location information in relation to various "live view" mode(s).

The buffer 180 receives and stores image data IDATA corresponding to signals provided by the data bus block 145, and thereafter communicates the image data IDATA to the DSP 200.

The control register block 190 may be used to control operation of the timing generator 150, ramp signal generator 160, and/or buffer 180 under the control of the DSP 200. According to embodiments, generation of switch control signals by the switch signal generator 170 may be controlled according to a control of the control register block 190, or may be controlled according to a control of the timing generator 150.

The DSP 200 illustrated in FIG. 1 includes an image signal processor (ISP) 210, a sensor controller 220, and an interface 230, where the ISP 210 may be used to control the sensor controller 220 which in turn controls the control register block 190 and an interface between the ISP 210 and the image sensor 100.

According to various embodiments, each of the image sensor 100 and DSP 200 may be embodied in respective chips or collectively embodied in a multi-chip package (MCP). According to other embodiments, the image sensor 100 and ISP 210 may be embodied in respective chips or a MCP. According to still other embodiments, the image sensor 100 and ISP 210 may be embodied in a single chip.

The ISP 210 receives and processes image data IDATA provided by the buffer 180 to create, for example, visible images that may be displayed on a display 300. The sensor controller 220 may be used to generate various control signals for controlling the control register block 190 according to a control of the ISP 210. The interface (I/F) 230 may be used to communicate image data provided by the ISP 210 to the display 300. Here, the display 300 may be embodied in a thin film transistor-liquid crystal display (TFT-LCD), a light emitting diode (LED) display, an organic LED (OLED) display, an active matrix OLED (AMOLED) display, a flexible display, or a transparent display, as examples.

Figure 2:
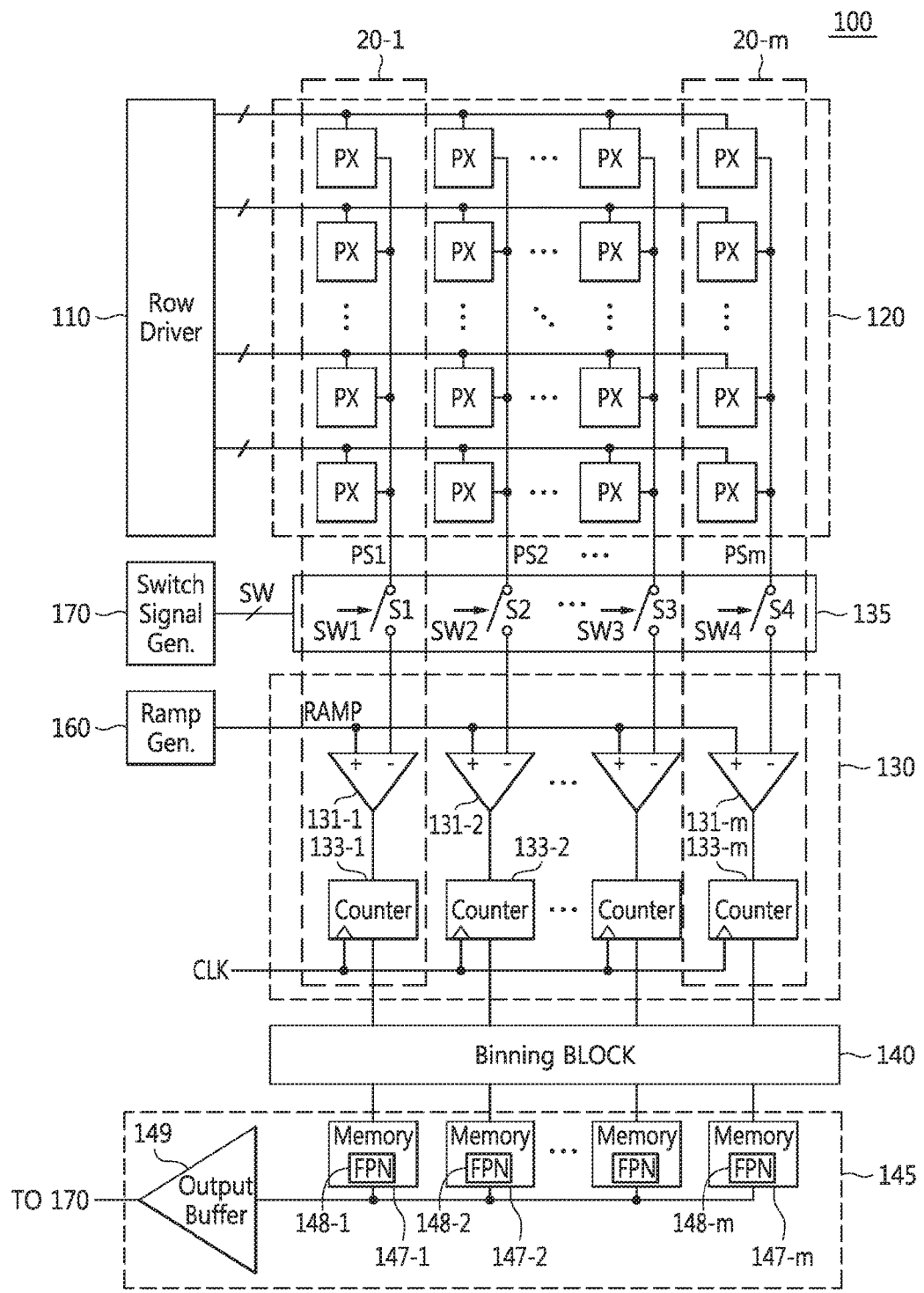
FIG. 2 is a detailed block diagram of an image sensor shown in FIG. 1 according to an embodiment of the inventive concept.

FIG. 2 is a detailed block diagram of the image sensor shown in FIG. 1 according to an embodiment of the inventive concept. Referring to FIGS. 1 and 2, the image sensor 100 may include a plurality of column-parallel pipelines 20-1 to 20-$m$. For example, an $i^{th}$ pipeline 20-$i$, where 1 among the column-parallel pipelines 20-1 to 20-$m$ may include a plurality of pixels in units of columns included in the active pixel block 120, a first binning switch S1, a first comparator 131-$i$, and a first counter 133-$i$.

The active pixel block 120 may include a plurality of pixels (PX) arranged in a matrix of rows and columns. The plurality of pixels may include red, green and blue pixels, but the scope of the inventive concept is not limited to only pixels of this type.

The row driver 110 is used to drive the plurality of pixels included in the active pixel block 120 according to row units in response to various control signals, In response to still further control signals, pixel signals PS1 to PSm provided according to column units are communicated to the binning switch block 135.

The binning switch block 135 includes a plurality of switches (e.g., switches S1 to S4) that control the output of the pixel signals PS1 to PSm from the active pixel block 120. The plurality of switches S1 to S4 may be turned ON/OFF in response to switch control signals SW1 to SW4 (collectively, switch control signals SW) provided by the switch signal generator 170.

For convenience of description, it is assumed that a first pipeline 20-1, a second pipeline 20-2, and a third pipeline 20-3 among the plurality of column-parallel pipelines 20-1 to 20-$m$ are sequentially adjacent to each other.

According to an embodiment, when the image sensor 100 determines according to FPN location information that the first pipeline 20-1 is noisy and the second pipeline 20-2 is quiet, the switch signal generator 170 generates a first switch control signal SW1 that turns OFF a first switch S1 and a second control signal SW2 that turns ON a second switch S2.

According to another embodiment, when the image sensor 100 determines that the first pipeline 20-1 is noisy, the second pipeline 20-2 includes an AF pixel, and the third pipeline 20-3 is quiet, the switch signal generator 170 may generate a first switch control signal SW1 that turns OFF the first switch S1, a second control signal SW2 that turns OFF the second switch S2, and a third switch control signal SW3 that turns ON a third switch S3.

The illustrated example of FIG. 2 shows that each of the column-parallel pipelines 20-1 to 20-$m$ is operationally associated with a corresponding switch (e.g., S1 to S4) arranged in the binning switch block 135. However, the scope of the inventive concept is not limited to only this relationship, and the column-parallel pipelines 20-1 to 20-$m$ may include any reasonable collection and/or combination of switches arranged in the binning switch block 135.

The ADC block 130 of FIG. 2 includes a plurality of comparators 131-1 to 131-$m$ and a plurality of counters 133-1 to 133-$m$. Each of the comparators 131-1 to 131-$m$ compares a signal output from a corresponding switch among the switches S1 to S4 included in the binning switch block 135 with a ramp signal RAMP output from the ramp signal generator 160, and transmits each comparison signal to each of the counters 133-1 to 133-$m$.

Each of the counters 133-1 to 133-$m$ may be used to count level transition time of each comparison signal output from each of the comparators 131-1 to 131-$m$, and output digital signals generated according to a result of the counting, using a clock signal CLK. Here, the level transition time may be determined according to a level of the ramp signal RAMP and a level of each of the pixel signals PS1 to PSm. According to an embodiment, each of the counters 133-1 to 13-$m$ may be embodied in a Z-bit counter, where 'Z' is a natural number greater than 1.

A clock signal generator (not shown) generating a clock signal CLK may be embodied in one of the counters 133-1 to 133-$m$, the timing generator 150, and/or the image sensor 100. That is, the location of the clock signal generator may be variously changed according to different design specifications.

The binning block 140 may perform a digital binning operation using digital signals output from each of the counters 133-1 to 133-$m$, where as previously noted, digital binning is essentially a process of combining charges of adjacent pixels in the image sensor 100 during a readout operation.

The data bus block 145 of FIG. 2 includes a plurality of memories 147-1 to 147-$m$ and an output buffer 149. Each of the memories 147-1 to 147-$m$ may receive and store a digital signal output from each of the counter 133-1 to 133-*m*. Each of the memories 147-1 to 147-*m* may store fixed pattern noise location information 148-1 to 148-*m* generated based on the column-parallel pipelines 20-1 to 20-*m*. For example, each of the memories 147-1 to 147-*m* may be embodied in a SRAM, a latch, or a flip-flop. The output buffer 149 may transmit the fixed pattern noise location information 148-1 to 148-*m* output from each of the memories 147-1 to 147-*m* to the switch signal generator 170.

Figure 3:
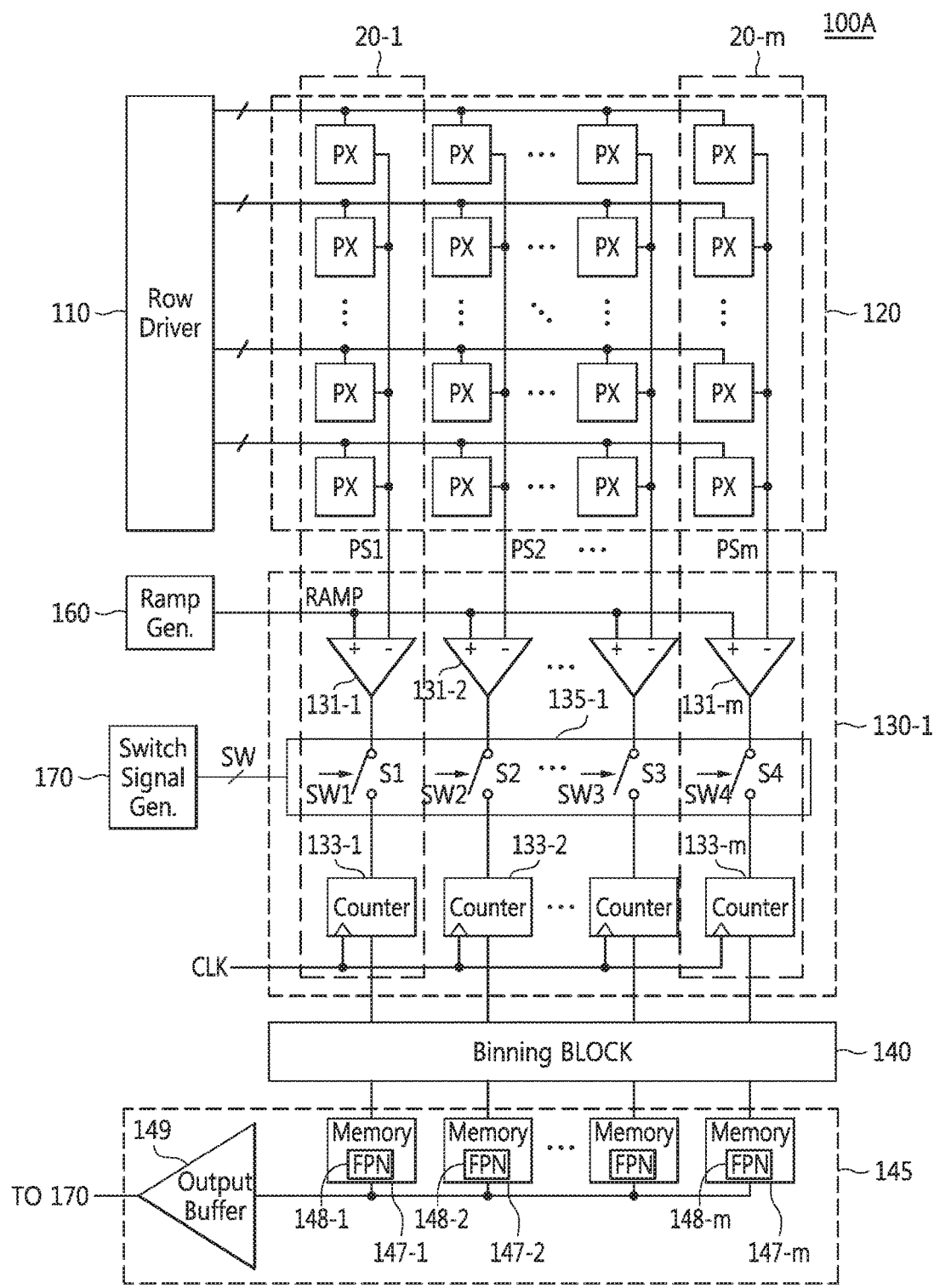
FIG. 3 is a detailed block diagram of the image sensor shown in FIG. 1 according to another embodiment of the inventive concept.

FIG. 3 is a detailed block diagram of the image sensor shown in FIG. 1 according to another embodiment of the inventive concept. Except that the binning switch block 135-1 is embodied in the ADC block 130-1, the structure and operation of an image sensor 100A shown in FIG. 3 are substantially the same as the structure and operation of the image sensor 100 shown in FIGS. 1 and 2.

Referring to FIGS. 1, 2 and 3, the ADC block 130-1 includes the plurality of comparators 131-1 to 131-*m*, the plurality of counters 133-1 to 133-*m*, and the binning switch block 135-1. Each of the comparators 131-1 to 131-*m* may compare pixel signals PS1 to PSm output from the APS block 120 and a ramp signal RAMP output from the ramp signal generator 160, an transmit each comparison signal to the binning switch block 135-1.

The binning switch block 135-1 includes the plurality of switches S1 to S4, and control an output of each comparison signal output from each of the comparators 131-1 to 131-*m*. The plurality of switches S1 to S4 may be turned on or off in response to the plurality of switch control signals SW1 to SW4 (collectively, SW) output from the switch signal genitor 170. Each of the counters 133-1 to 133-*m* may be used to count a level transition time for each comparison signal output from the binning switch block 135 using a clock signal CLK, and output digital signals generated according to a result of the counting.

Figure 4:
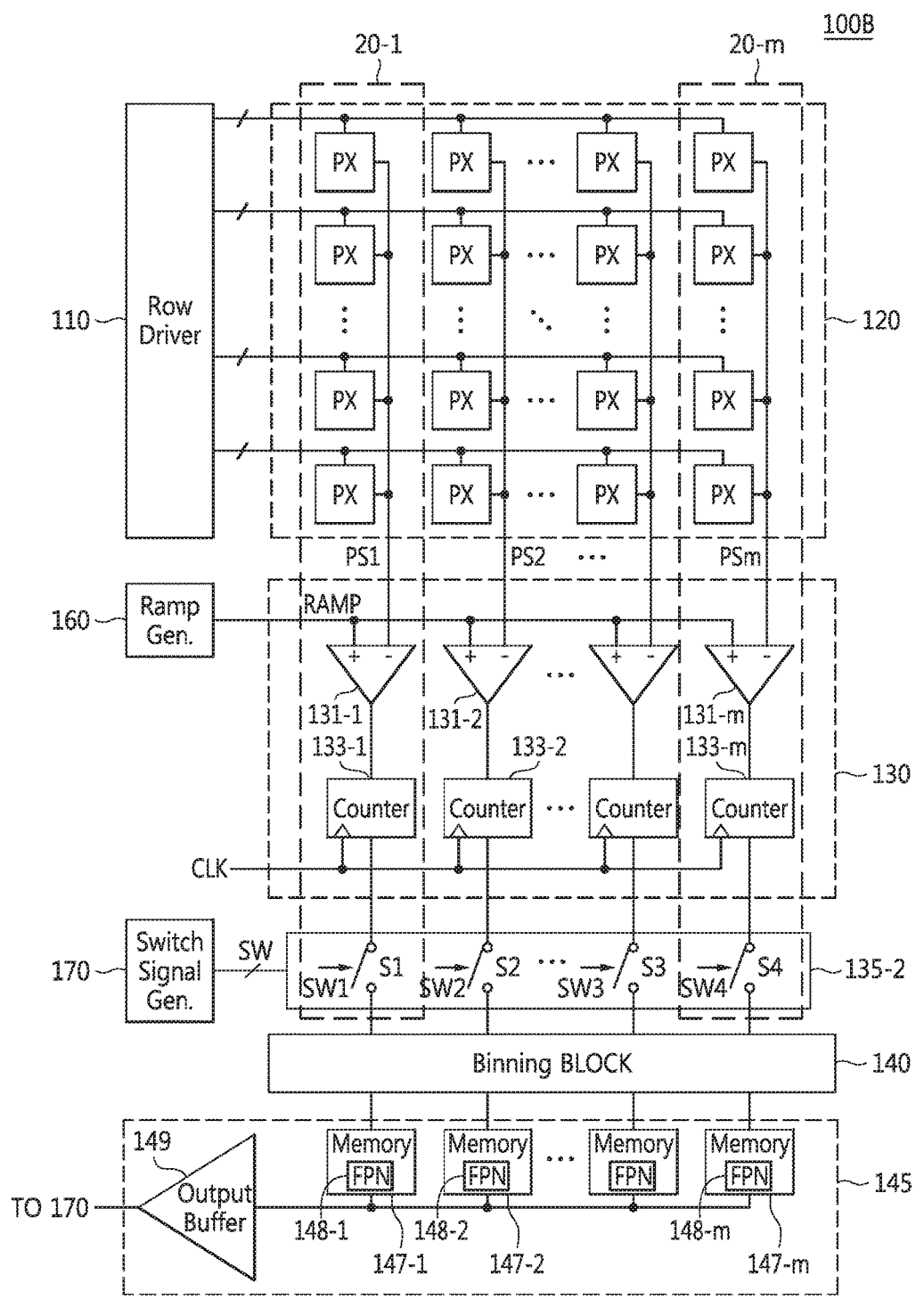
FIG. 4 is a detailed block diagram of the image sensor shown in FIG. 1 according to still another embodiment of the inventive concept.

FIG. 4 is a detailed block diagram of the image sensor shown in FIG. 1 according to still another embodiment of the inventive concept. Except that the binning switch block 135-2 is embodied between the ADC block 130 and the binning block 140, the structure and operation of an image sensor 100B shown in FIG. 4 are substantially the same as the structure and operation of the image sensor 100 show in FIGS. 1 and 2.

Referring to FIGS. 1, 2, 3 and 4, the binning switch block 135-2 includes the plurality of switches S1 to S4, and control an output of digital signals output from each of the counters 133-1 to 133-*m*. The plurality of switches S1 to S4 may be turned ON/OFF in response to the plurality of switch control signals SW1 to SW4 (collectively, SW) output from the switch signal generator 170.

Figure 5:
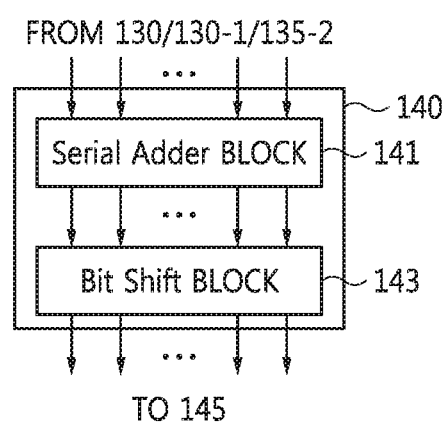
FIG. 5 is a detailed block diagram of a binning block shown in FIG. 1.

FIG. 5 is a detailed block diagram of the binning block 135 shown in FIG. 1. Referring to FIGS. 1 and 5, the binning block 140 may include a serial adder block 141 and a bit shift block 143. The serial adder block 141 may generate a compound signal by adding digital signals output from the ADC block 130 or 130-1.

For example, the serial adder block 141 may compound a first digital signal output from a first (quiet) pipeline not generating FPN among the column-parallel pipelines 20-1 to 20-*m* and a second digital signal output from a second (quiet) pipeline not generating FPN among the column-parallel pipelines 20-1 to 20-*m*. According to an embodiment, the serial adder block 141 may generate a compound signal by adding digital signals output from the binning switch block 135-2.

The bit shift block 143 may shift a compound signal received from the serial adder block 141 by as a preset number of bits, and output the bit-shifted signal to the data bus block 145. For, example, the bit shift block 143 may be embodied in a shift register, and may move loaded bits by one or more position(s) per clock cycle.

FIGS. 6, 7, 8, 9 and 10 are respective conceptual diagrams further describing the active pixel block 120 shown in FIG. 1 according to embodiments of the inventive concept. Referring collectively to FIGS. 1 to 10, only 16 pixels 120-1 to 120-5 which are a portion of the APS block 120 are shown in each of FIGS. 6 to 10. For convenience of description in the present specification, only a portion of the APS block 120 is shown, and pixels having substantially the same configuration as the 16 pixels 120-1 to 120-5 may be included in a region besides the 16 pixels 120-1 to 120-5.

Each of the 16 pixels 120-1 to 120-5 shown in FIGS. 6 to 10 may include a first pixel group 120-1A to 120-5A, a second pixel group 120-1B to 120-5B, a third pixel group 120-1C to 120-5C, and a fourth pixel group 120-1D to 120-5D, which are arranged in a Bayer pattern.

The first pixel group 120-1A to 120-5A may include a first red pixel R1 including a red filter, a first green-on-red pixel Gr1 including a green filter, a first green-on-blue pixel Gb1 including the green filter, and a first blue pixel B1 including a blue filter.

Likewise the first pixel group 120-1A to 120-5A, the second pixel group 120-1B to 120-5B, the third pixel group 120-1C to 120-5C, and the fourth pixel group 120-1D to 120-5D may include one red pixel R2, R3, or R4, one green-on-red pixel Gr2, Gr3, or Gr4, one green-on-blue pixel Gb2, Gb3, or Gb4, and one blue pixel B2, B3, or B4, respectively.

For convenience of description, it is assumed that a readout column to be read by the image sensor 100, 100A or 100B is a column including a second red pixel R2, and a binning column to be binned with the readout column by the image sensor 100, 100A, or 100B is a column including a third red pixel R3.

Figure 6:
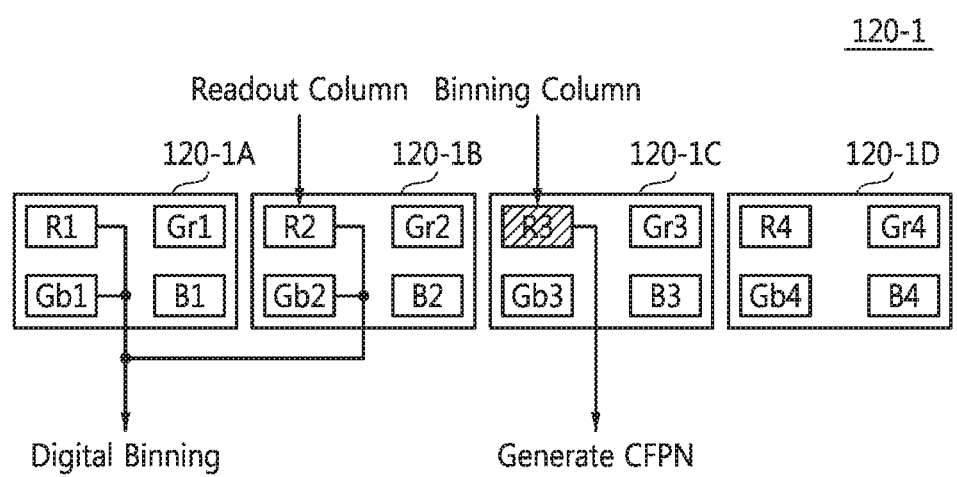
FIG. 6 is a conceptual diagram describing an active pixel block shown in FIG. 1 according to an embodiment of the inventive concept.

FIG. 6 is a conceptual diagram describing an active pixel block shown in FIG. 1 according to an embodiment of the inventive concept. Referring to FIGS. 1 to 6, when the image sensor 100, 100A, or 100B determines that column fixed pattern noise (CFPN) is being generated by the third red pixel R3, the image sensor 100, 100A, or 100B performs digital binning on a readout column including the second red pixel R2 and a column including the first red pixel R1.

Figure 7:
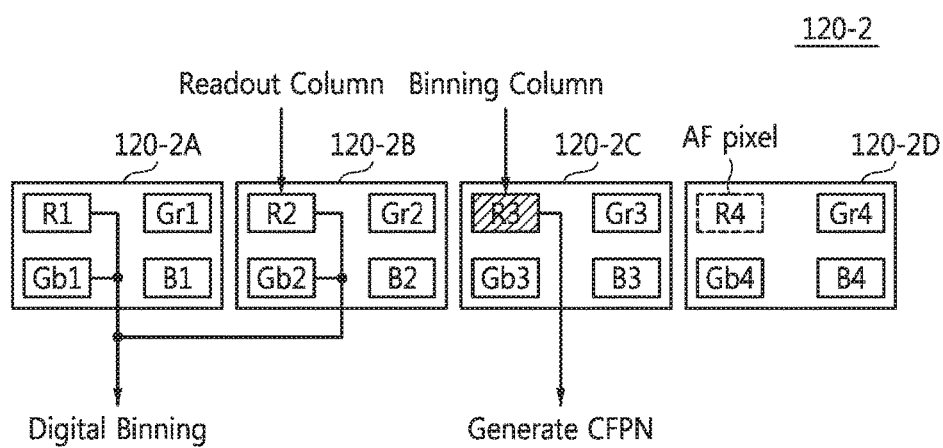
FIG. 7 is a conceptual diagram describing the active pixel block shown in FIG. 1 according to another embodiment of the inventive concept.

FIG. 7 is a conceptual diagram describing the active pixel block shown in FIG. 1 according to another embodiment of the inventive concept. Referring to FIGS. 1 to 7, when the image sensor 100, 100A, or 100B determines that CFPN is being generated by the third red pixel R3 and the fourth red pixel R4 is the AF pixel, the image sensor 100, 100A or 100B performs digital dinning on a readout column including the second red pixel R2 and a column including the first red pixel R1.

Figure 8:
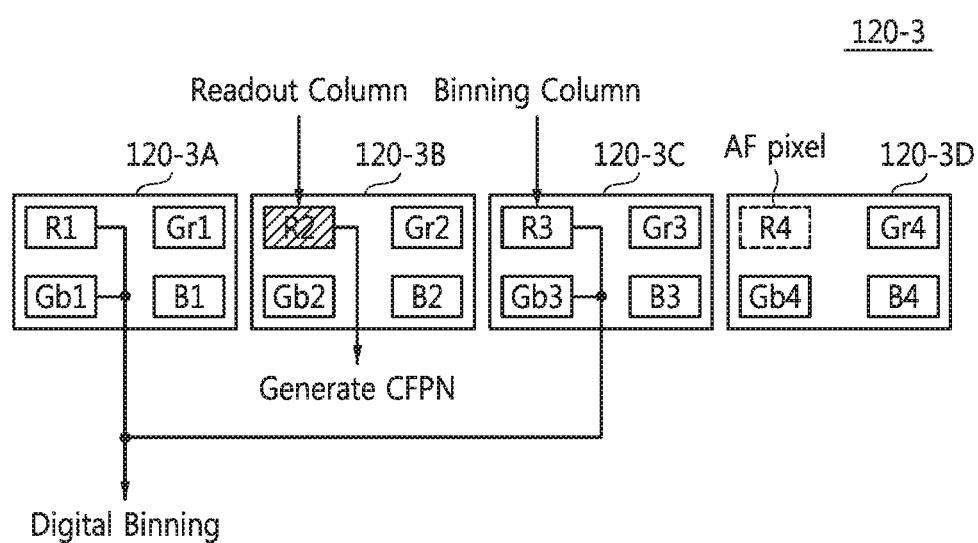
FIG. 8 is a conceptual diagram describing the active pixel block shown in FIG. 1 according to still another embodiment of the inventive concept.

FIG. 8 is a conceptual diagram describing the active pixel block shown in FIG. 1 according to still another embodiment of the inventive concept. Referring to FIGS. 1 to 8, when the image sensor 100, 100A, or 100B determines CFPN is being generated by the second red pixel R2 and the fourth red pixel R4 is the AF pixel, the image sensor 100, 100A, or 100B performs digital binning on a binning column including the third red pixel R3 and a column including the first red pixel R1.

Figure 9:
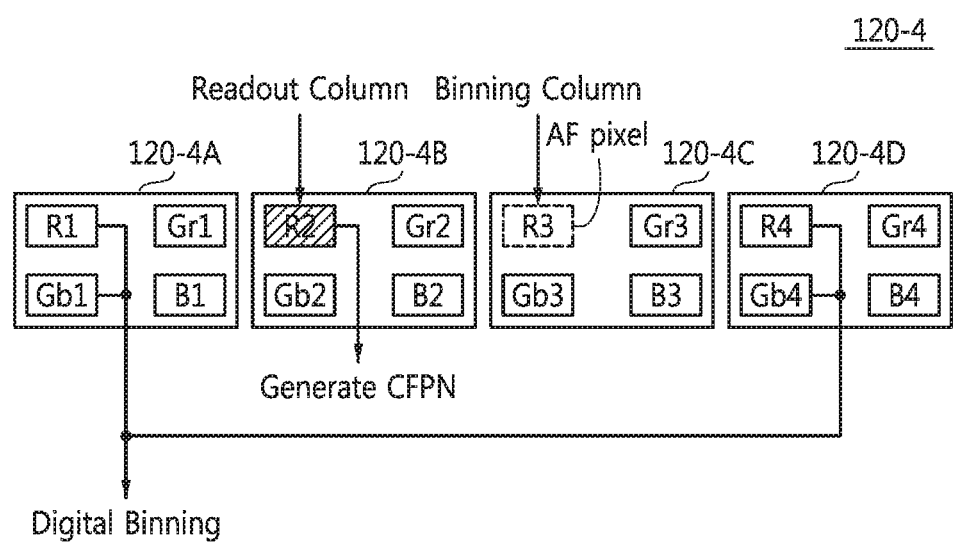
FIG. 9 is a conceptual diagram describing the active pixel block shown in FIG. 1 according to still another embodiment of the inventive concept.

FIG. 9 is a conceptual diagram describing the active pixel block shown in FIG. 1 according to still another embodiment of the inventive concept. Referring to FIGS. 1 to 9, when the image sensor 100, 100A, or 100B determines that CFPN is being generated by the second red pixel R2 and the third red pixel R3 is the AF pixel, the image sensor 100, 100A, or 100B performs digital binning on a column including the first red pixel R1 and a column including the fourth red pixel R4.

Figure 10:
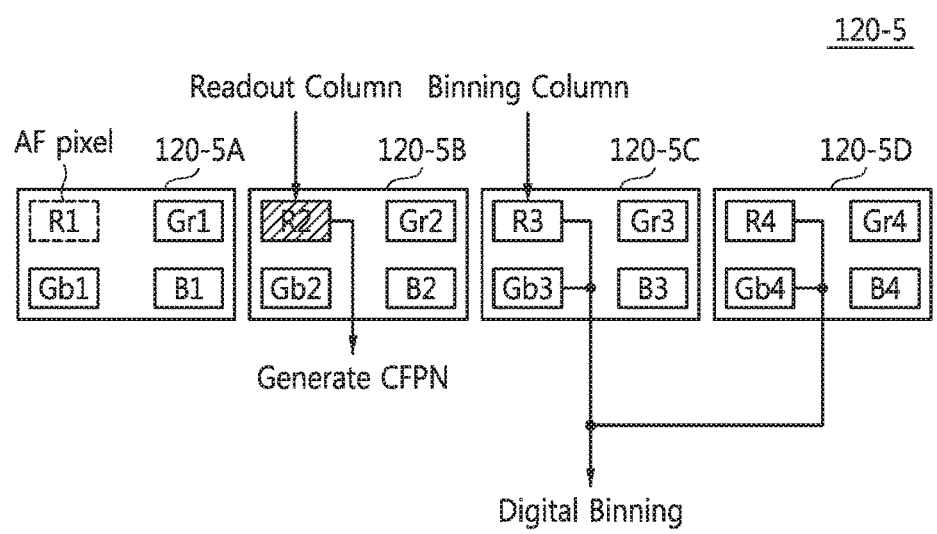
FIG. 10 is a conceptual diagram describing the active pixel block shown in FIG. 1 according to still another embodiment of the inventive concept.

FIG. 10 is a conceptual diagram describing the active pixel block shown in FIG. 1 according to still another embodiment of the inventive concept. Referring to FIGS. 1 to 10, when the image sensor 100, 100A, or 100B determines that CFPN is being generated by the second red pixel R2, and the first red pixel R1 is the AP pixel, the image sensor 100, 100A, or 100B performs digital binning on a binning column including the third red pixel R3 and a column including the fourth red pixel R4.

Figure 11:
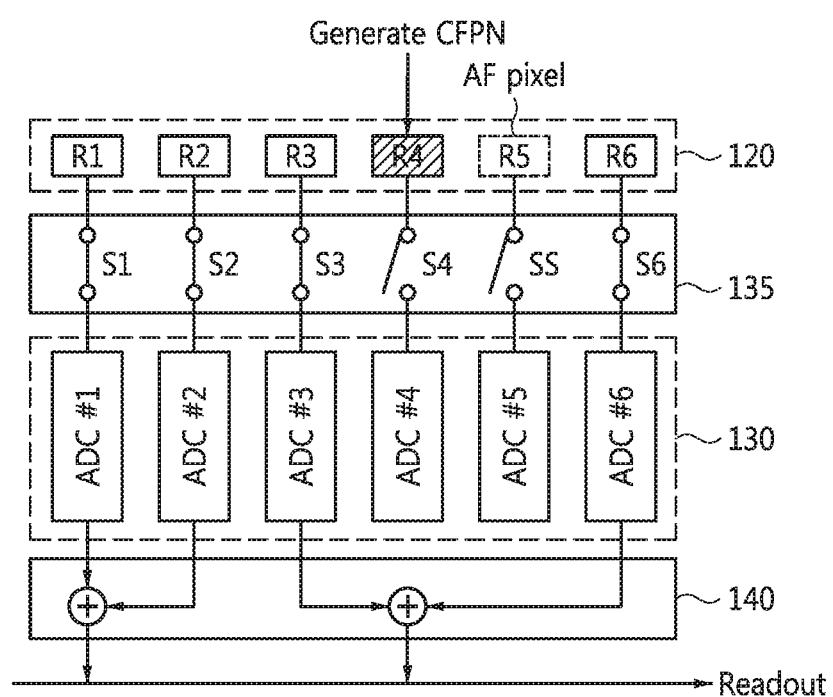
FIG. 11 is a conceptual diagram describing a digital binning operation according to an embodiment of the inventive concept.

FIG. 11 is a conceptual diagram describing a digital binning operation according to an embodiment of the inventive concept. Referring to FIGS. 1 to 11, it is assumed that the APS block 120 includes six red pixels R1 to R6 for convenience of description.

When the image sensor 100, 100A, or 100B determines that the first red pixel R1 and the second red pixel R2 are pixels not generating CFPN, the image sensor 100, 100A, or 100B perform digital binning on a first digital signal corresponding to the first red pixel R1 output from the ADC block 130 and a second digital signal corresponding to the second red pixel R2 output from the ADC block 130 using the binning block 140.

The image sensor 100, 100A, or 100B may readout a first digital binning signal which is made by performing digital binning on the first digital signal corresponding to the first red pixel R1 and the second digital signal corresponding to the second red pixel R2 through the data bus block 145.

When the image sensor 100, 100A, or 100B determines that CFPN is being generated in the fourth red pixel R4, and a fifth red pixel R5 is the AF pixel, the image sensor 100, 100A, or 100B performs digital binning of a third digital signal corresponding to the third red pixel R3 output from the ADC block 130 and a sixth digital signal corresponding to a sixth red pixel R6 output from the ADC block 130 using the binning block 140. At this time, the binning switch block 135 may turn OFF each of a fourth switch S4 corresponding to the fourth red pixel R4 and a fifth switch S5 corresponding to the fifth red pixel R5 in response to switch control signals output from the switch signal generator 170.

The image sensor 100, 100A, or 100B may readout a second digital binning signal which is made by performing digital binning on the third digital signal corresponding to the third red pixel R3 and the sixth digital signal corresponding to the third red pixel R6 through the data bus block 145.

Figure 12:
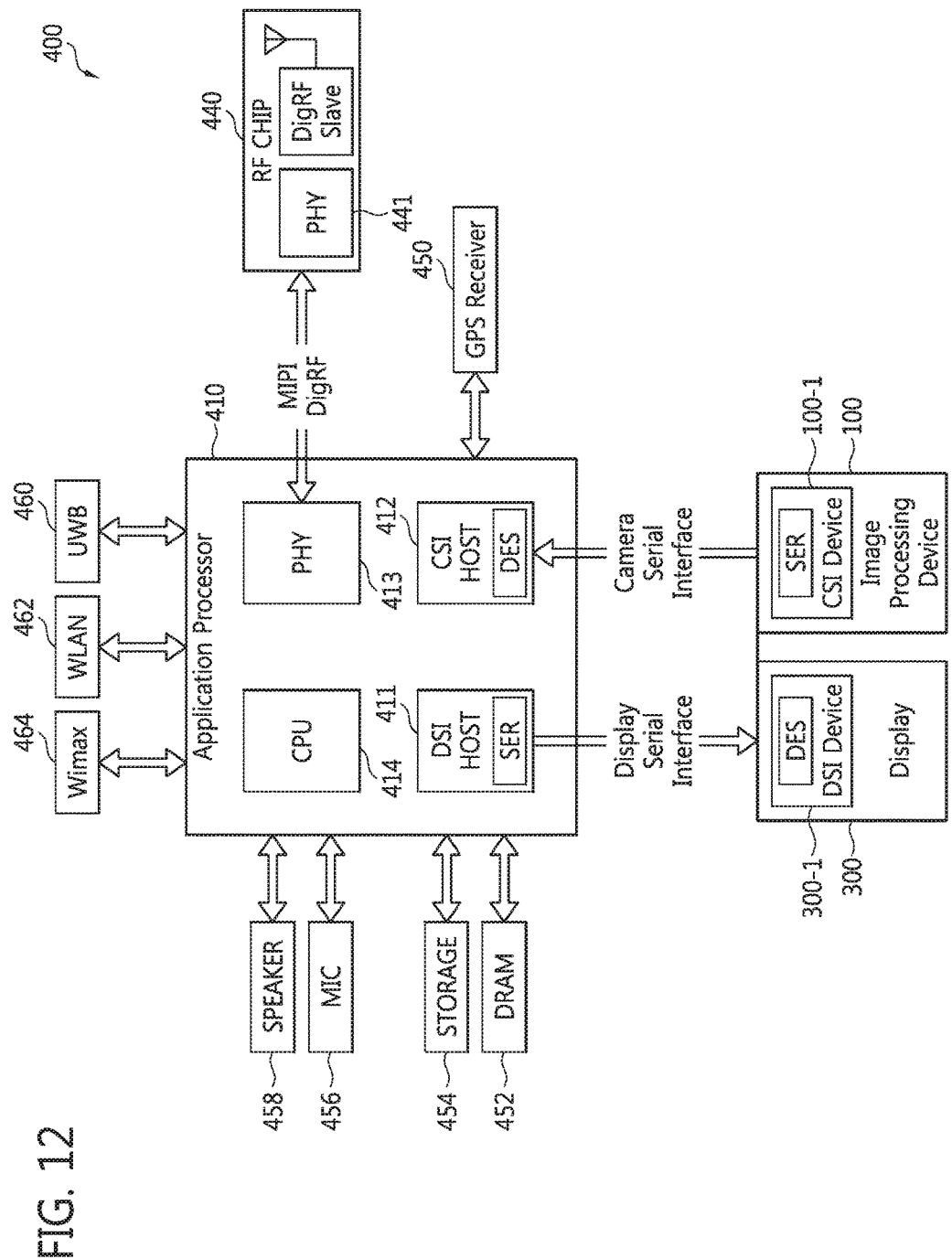
FIG. 12 is a block diagram of the image processing system according to another embodiment of the inventive concept.

FIG. 12 is a block diagram of an image processing system according to another embodiment of the inventive concept. Referring to FIGS. 1 to 12, an image processing system 400 may be embodied in an image processing system which can use or support a mobile industry processor interface (MIPI).

The image processing system 400 may be embodied in a laptop computer, a mobile phone, a smart phone, a tablet PC, a PDA, an EDA, a digital still camera, a digital video camera, a PMP, a mobile internet device, a wearable computer, an internet of things (IoT) device, or an internet of everything (IoE) device. The image processing system 400 may include an application processor (AP) 410, an image processing device 100, and a display 300. At this time, the image processing device 100 may be the image sensor 100 described referring to FIGS. 1 to 11.

A camera serial interface (CSI) host 412 embodied in the AP 410 may perform a serial communication with a CSI device 100-1 of the image processing device 100 through a CSI. According to an embodiment, the CSI host 412 may include a de-serializer DES, and the CSI device 100-1 may include a serializer SER.

A display serial interface (DSI) host 411 embodied in the AP 410 may perform a serial communication with a DSI device 300-1 of the display 300 through a DSI. According to an embodiment, the DSI host 411 may include the serializer SER, and the DSI device 300-1 may include the de-serializer DES. For example, image data (IDATA of FIG. 1) output from the image processing device 100 may be transmitted to the AP 410 through the CSI. The AP 410 may process the image data (IDATA of FIG. 1), and transmit the processed image data to the display 300 through a DSI.

The image processing system 400 may further include a RF chip 440 which can communicate with the AP 410. A physical layer (PHY) 413 of the image processing system 400 and the physical layer (PHY) 441 of the RF chip 440 may transmit or receive data to or from each other according to MIPI DigRF. The CPU 414 may control an operation of each of the DSI host 411, the CSI host 412, and the PHY 413, and include one or more cores.

The AP 410 may be embodied in an integrated circuit, and a system on chip (SoC), and may be a processor or a host which can control an operation of the image processing device 100.

The image processing system 400 may include a GPS receiver 450, a volatile memory 452 such as a dynamic random access memory (DRAM), a data storage device 454 which is embodied in a non-volatile memory such as a flash-based memory, a microphone (MIC) 456, or a speaker 458. The data storage device 454 may be embodied in an external memory detachable from the AP 410. Moreover, the data storage device 454 may be embodied in a universal flash storage (UFS), a multimedia card (MMC), an embedded MIVIC (eMMC), a USB flash drive, or a memory card. In addition, the image processing system 400 may communicate with an external device by using at least one communication protocol (or communication standard), e.g., a ultra-wideband (UWB) 460, a wireless LAN (WLAN) 462, a worldwide interoperability for microwave access (Wi-MAX) 464, or a long term evolution (LTE™) which is not shown.

According to an embodiment, the image processing system 400 may further include at least one of an NFC module, a WiFi module, and a Bluetooth module.

Figure 13:
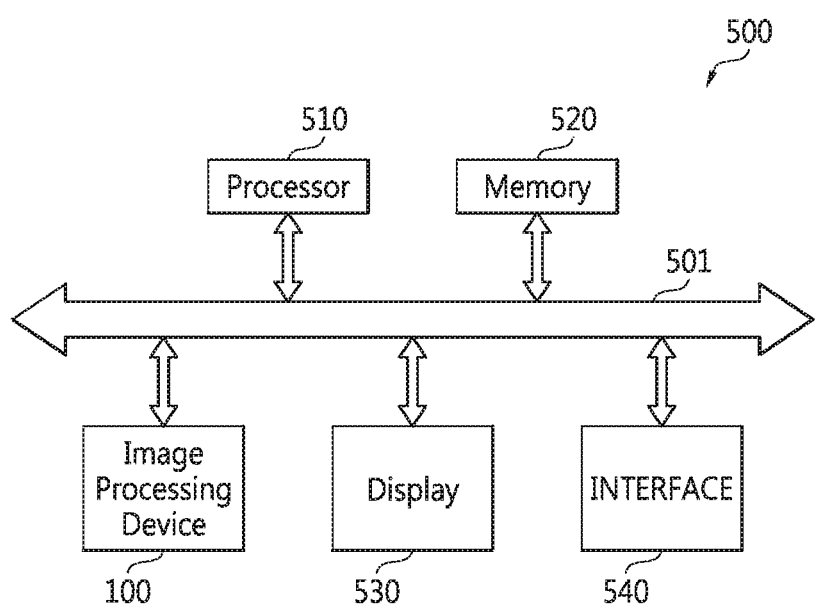
FIG. 13 is a block diagram of the image processing system according to still another embodiment of the inventive concept.

FIG. 13 is a block diagram of an image processing system according to still another embodiment of the inventive concept. Referring to FIGS. 1 to 13, an image processing system 500 may include an image processing device 100, a processor 510, a memory 520, a display 530, and an interface 540. At this time, the image processing device 100 may be the image sensor 100 described referring to FIGS. 1 to 11.

The processor 510 may control an operation of the image processing device 100. For example, the processor 510 may generate image data by processing a pixel signal output from the image processing device 100. The memory 520 may store a program for controlling an operation of the image processing device 100 and image data generated by the processor 510. The processor 510 may perform a program stored in the memory 520. For example, the memory 510 may be embodied in a volatile memory or a non-volatile memory.

The display 530 may display the image data output from the processor 510 or the memory 520. The interface 540 may be embodied in an interface for inputting or outputting image data. According to an embodiment, the interface 540 may be embodied in a wired interface or a wireless interface.

An image sensor according to an embodiment of the inventive concept may improve a yield rate of an image sensor by compensating a fixed pattern noise output through each column in the image sensor.

Although a few embodiments of the present general inventive concept have been shown and described, it will be appreciated by those skilled in the art that changes may be made in these embodiments without departing from the scope of the inventive concept as defined by the appended claims and their equivalents.

What is claimed is:

1. An image sensor reading out a pixel signal provided by at least one of a plurality of pixels and compensating for fixed pattern noise (FPN) in column-parallel pipelines, the image sensor comprising:
   a switch signal generator configured to generate a first switch control signal and a second switch control signal in response to FPN location information characterizing a first pipeline among the column-parallel pipelines as a noisy pipeline generating FPN, and characterizing a second pipeline among the column-parallel pipelines as a quiet pipeline not generating FPN;
   a binning switch block including a first switch controlled by the first switch control signal and a second switch controlled by the second switch control signal, wherein the first switch control signal causes the first pipeline to be inactivated and the second switch control signal causes the second pipeline to be activated; and
   a binning block connected to each of the column-parallel pipelines, and configured to perform a digital binning operation on digital signals provided via the column-parallel pipelines including the second pipeline and output the binned digital signals corresponding to each of the column-parallel pipelines.

2. The image sensor of claim 1, wherein each of the column-parallel pipelines comprises:
   a plurality of pixels arranged in a column unit;
   at least one switch disposed in the binning switch block, responsive to a corresponding switch control signal; and
   an analog-to-digital converter (ADC).

3. The image sensor of claim 1, further comprising:
   a data block connected to the binning block and configured to store the binned digital signals as the image data and output the image data.

4. The image sensor of claim 1, wherein the first pipeline and the second pipeline are adjacent to each other among the column-parallel pipelines.

5. The image sensor of claim 1, further comprising:
   a memory that stores the FPN location information.

6. The image sensor of claim 1,
   wherein at least one pipeline among the column-parallel pipelines includes an auto focus (AF) pixel providing information for an auto focusing operation, and
   the at least one pipeline among the column-parallel pipelines including the AF pixel is inactivated by the binning switch block.

7. The image sensor of claim 6, further comprising:
   a memory that stores the FPN location information and location information indicating the least one pipeline among the column-parallel pipelines including the AF pixel.

8. The image sensor of claim 1, wherein the binning switch block comprises:
   a serial adder block that generates a compound signal by adding at least two digital signals; and
   a bit shift block that shifts the compound signal by a preset number of bits.

9. The image sensor of claim 1,
   wherein the binning switch block comprises a plurality of switches including the first switch and the second switch, and
   each of the plurality of switches is turned ON/OFF in response to a corresponding switch control signal.

10. The image sensor of claim 1, wherein the image sensor operates in a skip mode that is a live view mode or a movie mode.

11. The image sensor of claim 10, wherein the FPN location information is derived while the image sensor is operating in a still mode.

12. An image processing system comprising:
    an image sensor reading out a pixel signal provided by at least one of a plurality of pixels and compensating for fixed pattern noise (FPN) in column-parallel pipelines; and
    a processor that controls operation of the image sensor, wherein the image sensor includes:
       a switch signal generator configured to generate a first switch control signal and a second switch control signal in response to FPN location information characterizing a first pipeline among the column-parallel pipelines as a noisy pipeline generating FPN, and characterizing a second pipeline among the column-parallel pipelines as a quiet pipeline not generating FPN;
       a binning switch block including a first switch controlled by the first switch control signal and a second switch controlled by the second switch control signal, wherein the first switch control signal causes the first pipeline to be inactivated and the second switch control signal causes the second pipeline to be activated; and
       a binning block connected to each of the column-parallel pipelines, and configured to perform a digital binning operation on digital signals provided via the column-parallel pipelines including the second pipeline and output the binned digital signals corresponding to each of the column-parallel pipelines.

13. The image processing system of claim 12, further comprising:
    a data block connected to the binning block and configured to store the binned digital signals as the image data and output the image data.

14. The image processing system of claim 12, wherein each of the column-parallel pipelines comprises:
    a plurality of pixels arranged in column units;
    at least one switch disposed in the binning switch block and responsive to a corresponding switch control signal; and
    an analog-to-digital converter (ADC) including a comparator and a counter.

15. The image processing system of claim 12, wherein the first pipeline and the second pipeline are adjacent to each other among the column-parallel pipelines.

16. The image processing system of claim 12, wherein at least one pipeline among the column-parallel pipelines includes an auto focus (AF) pixel providing information for an auto focusing operation, and
    the at least one pipeline among the column-parallel pipelines including the AF pixel is inactivated by the binning switch block.

17. An CMOS image sensor providing image data to digital signal processor, the CMOS image sensor comprising:

a column-parallel pipelines providing respective output signals, wherein the column-parallel pipelines include a noisy pipeline that generates fixed pattern noise (FPN) and two quiet pipelines that do not generate FPN;

a switch signal generator configured to generate a switch control signal;

a binning switch block including a plurality of switches that inactivate the noisy pipeline and activate the two quiet pipelines in response to the switch control signal; and a binning block connected to each of the column-parallel pipelines, and configured to perform a digital binning operation on output signals provided respectively via the two quiet pipelines and output the binned digital signals corresponding to each of the column-parallel pipelines.

18. The CMOS image sensor of claim 17, further comprising:

a data block connected to the binning block and configured to store the binned digital signals as the image data and output the image data.

19. The CMOS image sensor of claim 17, wherein each of the column-parallel pipelines comprises:

a plurality of pixels arranged in a column unit;

a switch disposed in the binning switch block, responsive to the switch control signal; and an analog-to-digital converter (ADC).

20. The CMOS image sensor of claim 17, wherein the noisy pipeline and at least one of the two quiet pipelines are adjacent to each other among the column-parallel pipelines.

* * * * *